United States Patent Office 2,865,912
Patented Dec. 23, 1958

2,865,912

PROCESS FOR THE PRODUCTION OF O.O-DIAL-KYLPHOSPHORIC OR O.O - DIALKYLTHIONO-PHOSPHORIC ACID ESTERS OF N-ALKYLOL LACTAMS

Heinz Pohlemann and Harald Schroeder, Ludwigshafen (Rhine), Herbert Stummeyer, Mannheim, and Heinrich Adolphi, Limburgerhof, Pfalz, Germany, assignors to Badische Anilin- & Soda-Fabrik Aktiengesellschaft, Ludwigshafen (Rhine), Germany No Drawing. Application May 28, 1957
Serial No. 662,003

Claims priority, application Germany June 5, 1956

12 Claims. (Cl. 260—239.3)

This invention relates to a process for the production of new esters of O.O-dialkylphosphoric or O.O-dialkylthionophosphoric acids. In particular it relates to the production of esters of O.O-dialkyl phosphoric or O.O-dialkylthionophosphoric acids with N-alkylol-lactams.

It is already known that neutral esters of ortho-phosphoric or thionophosphoric acid are obtained by allowing compounds containing hydroxyl groups, for example alcohols or phenols, to act on phosphorus oxyhalides, mono- or di-chlorides of alkoxyphosphoric acids or the corresponding thionophosphorus compounds. Many of the phosphoric acid esters already prepared in large numbers are insecticides, fungicides or rodenticides or may be used in other ways, for example as softeners, agents for protecting against corrosion, flame protection agents or flotation agents.

We have now found that new valuable esters of phosphoric acid or thionophosphoric acid are obtained by reacting an O.O-dialkyl phosphoric or thionophosphoric acid monohalide of the general formula

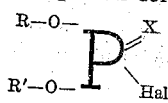

in which R and R' represent identical or different lower aliphatic saturated hydrocarbon radicals, in particular alkyl groups with 1 to 4 C-atoms, X is oxygen or sulfur, and Hal is a halogen atom with a N-alkylol-lactam of the general formula

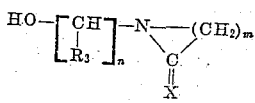

wherein $R_3$ is hydrogen, alkyl or trichloroalkyl radicals, advantageously one with 1 to 4 C-atoms. These radicals may be substituted by halogen, especially chlorine, and/or for an alkenyl, phenyl or cycloalkyl radicals. $n$ is an integer of 1 through 4 and $m$ is an integer of 3 through 7 and X has the above mentioned significance.

The reaction products correspond to the following general structure:

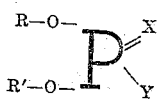

wherein Y is the radical remaining after splitting off the hydrogen atom from the hydroxyl group of the N-alkylol-lactam and

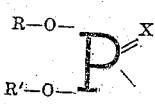

is the original radical contained in the phosphoric acid halide.

As O.O-dialkylphosphoric acid monohalides there come into question the chlorides, bromide and iodides of O.O-dialkylphosphoric acids; the chlorides being the preferred compounds. Moreover above all the corresponding halides, especially the chlorides, of the O.O-dialkylthionophosphoric acids are suitable to a special extent. The O.O-dialkylphosphoric acid monochlorides may be readily prepared for example by reaction of phosphoric oxychloride or thionophosphoric acid trichloride with aliphatic alcohols. Suitable compounds are for example dimethyl phosphoric acid chloride, dimethyl phosphoric acid bromide or iodide, also diethyl, dipropyl and dibutyl phosphoric acid chloride, bromide and iodide. Of the halides of O.O-dialkylthionophosphoric acids there may be mentioned for example the chlorides, bromide and iodides of dimethyl, diethyl, dipropyl or dibutyl thionophosphoric acid.

Suitable N-alkylol lactams are for example lactams or thiolactams of which the lactam ring contains 4 to 8 C-atoms and which are substituted at the nitrogen atom by aliphatic hydrocarbon radicals with 1 to 4 carbon atoms of which one C-atom bears a hydroxyl group. The hydrogen attached to the carbon atom of the alkylol radical can also be replaced by other atoms, for example halogens, or by other groups, for example phenyl chlorphenyl, nitrophenyl, propenyl or cyclohexyl groups. Especially suitable alkylol radicals are for example methylol, dihydroxyethyl and beta-trichlor-alpha-hydroxyethyl radicals. As representatives of the N-alkylol lactams serving as initial materials there may be specified for example N-methylol-pyrrolidone - (2), N - hydroxyethyl - pyrrolidone - (2), N - hydroxypropyl - pyrrolidone - (2), N - methylol-piperidone - (2), N - hydroxyethyl - piperidone - (2), N - methylol - caprolactam, N - hydroxyethyl - caprolactam, N - methylol - oenantholactam, N - hydroxyethyl-oenantholactam, N - methylol - caprylic lactam, N - hydroxyethyl-caprylic lactam, N-methylol-phthalimidine, N - methylol - menthone - isoxime, N - (alpha - hydroxy-beta - trichlorethyl) - caprolactam, and also N - (phenyl-hydroxy methyl)-, N-(alpha-methyl-beta-hydroxyethyl)-, or N - (nitro - phenyl - hydroxymethyl) - pyrrolidone-(2), -piperidone-(2), -caprolactam, -oenantholactam or -caprylic lactam. The corresponding compounds derived from the corresponding thiolactams may also be mentioned.

The reaction takes place by bringing together the two reaction components, in an anhydrous media it being immaterial which component is added to the other. It is preferable to add the phosphoric acid monohalide to the alkylol lactam. In general the initial materials are used in equivalent amounts, but sometimes it may be of advantage to use one or other component in excess, for example 1.2 to 1.5 times the amount which is theoretically necessary. Solvents, especially anhydrous organic solvents, for example aromatic, aliphatic and cycloaliphatic hydrocarbons, such as benzene, toluene, xylene, petroleum ether and cyclohexane, and also aliphatic chloro-hydrocarbons, such as methylene chloride or chloroform or other chloro-hydrocarbons, and also ketones, such as acetone methyl ethyl ketone, and ethers, especially cyclic ethers with oxygen combined in the ring, such as tetrahydrofurane and dioxane, may be present during the reaction. The use of solvents is recommended especially when one or both reactants are solid. It has proved to be advantageous to intercept the hydrogen halide set free by known agents for binding hydrogen halide, for example by the addition of aromatic amines containing nitrogen combined in the ring, such as pyridine, or tertiary lower aliphatic amines, such as triethylamine, or tripropylamine, the boiling points of which lie above the reaction temperature. Alkali carbonates or alkali bicarbonates can also be used for this purpose. The aforesaid materials effectively remove hydrogen halide as it is formed from the sphere of the reaction. This removal of the liberated halogen acids may be referred to as base neutralization of the halogen acids.

Although the reaction proceeds perceptibly even in the cold, it is preferable to work at higher temperatures, for example between 10° and 100° C., especially between 30° and 70° C.

The new O.O-dialkylphosphoric or thionophosphoric acid esters of N-alkylol lactams are excellent agents for combating pests more specifically insect pests, especially houseflies (*Musca domestica*) and aphides.

The following examples will further illustrate this invention but the invention is not restricted to these examples. The parts specified in the examples are parts by weight.

Example 1

395 parts of pyridine are added to a mixture of 575 parts of N-methylol-pyrrolidone-(2) and 1,500 parts of benzene and into this mixture, while stirring vigorously at room temperature, there are slowly introduced 940 parts of O.O-diethyl-thionophosphoric acid chloride. The whole is then stirred for about 6 hours at 60° C. and then allowed to cool to room temperature. The reaction mixture is introduced into 1,000 parts of water, the aqueous mixed stirred well throughout and then allowed to stand. Two layers occur, which are separated. The aqueous layer is extracted with benzene and the extract united with the non-aqueous layer. The benzene solution is washed with water, dried and the solvent distilled off. 431 parts of diethyl-thionophosphoric acid ester of N-methylol-pyrrolidone are obtained as a yellow non-distillable oil of the formula:

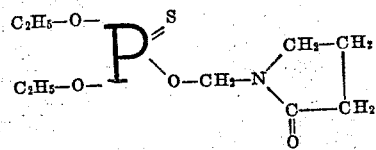

By working in the same way but replacing the 1,500 parts of benzene present during the reaction by 3,000 parts of chloroform, there are obtained (after stirring the reaction mixture for 5 hours at 50° C. after the addition of the diethyl thionophosphoric acid chloride has been completed, and after working up in a corresponding manner) 1,190 parts (corresponding to 89% of the theoretical yield) of the diethyl-thionophosphoric acid ester of N-methylol-pyrrolidone as a red oil.

Example 2

330 parts of N-(beta-hydroxyethyl)-pyrrolidone-(2) are mixed with 500 parts of benzene and 202 parts of anhydrous pyridine, and then 481 parts of O.O-diethyl-thionophosphoric acid chloride are allowed to flow in slowly into this mixture at room temperature while stirring. The whole is stirred for a further 4 hours at 50° C. to complete the conversion.

After cooling, 1,000 parts of benzene and 1,000 parts of water are added to the reaction mixture and it is worked up as described in Example 1. After distilling off the solvent in vacuo, 404 parts of the compound of the formula

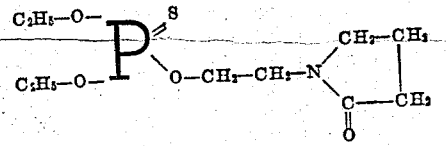

are obtained as a yellow non-distillable oil.

If the reaction is carried out by allowing a mixture of 320 parts of N-(beta-hydroxyethyl)-pyrrolidone-(2), 196 parts of pyridine and 1,000 parts of benzene to flow at room temperature while stirring into 467 parts of O.O-diethylthionophosphoric acid chloride, and further stirring for 2 hours at 80° C. after the end of the addition, there are obtained, after working up in the way described above, 480 parts of the product specified in the preceding paragraph.

Example 3

564 parts of O.O-diethyl-thionophosphoric acid chloride are introduced at room temperature while stirring vigorously into a mixture which consists of 429 parts of N-methylol-caprolactam and 237 parts of anhydrous pyridine. The whole is then stirred for 10 hours at 30° C., the reaction mixture allowed to cool to room temperature and introduced into 500 parts of water and 1,500 parts of benzene. After working up the mixture, as described in Example 1, There are obtained, after distilling off the solvent in vacuo, 430 parts of O.O-diethyl-O-(azacycloheptanone-(2)-yl-(1))-methyl thionophosphate as a yellowish non-distillable oil.

Example 4

550 parts of O.O-diethyl-thionophosphoric acid chloride are introduced while stirring well at room temperature into a mixture of 500 parts of N-methylol caprylic lactam, 500 parts of benzene and 231 parts of anhydrous pyridine. To complete the reaction, the whole is stirred for about 4 hours further at 50° C. It is allowed to cool, the reaction mixture is diluted with 1,000 parts of benzene and poured into 1,000 parts of water. After good thorough mixing, it is allowed to settle and the phases are separated. From the non-aqueous phase, 373 parts of O.O-diethyl-thionophosphoric acid ester of N-methylol caprylic lactam are obtained as a yellowish non-distillable oil.

If the reaction is carried out in the same way while using 1,750 parts of chloroform instead of 500 parts of benzene, there are obtained, after working up, 778 parts of O.O-diethyl-thionophosphoric acid ester of N-methylol caprylic lactam. The yield amounts to 82.4% of the theoretical yield.

Example 5

326 parts of N-methylol-phthalimidine are stirred into 100 parts of chloroform and 158 parts of pyridine are added. Then 376 parts of O.O-diethyl-thionophosphoric acid chloride are introduced and the whole stirred for 5 hours at 45° to 50° C. to complete the reaction. It is allowed to cool, the reaction mixture shaken several times with water, the chloroform solution dried and the solvent distilled off in vacuo. 460 parts of an oil of the formula

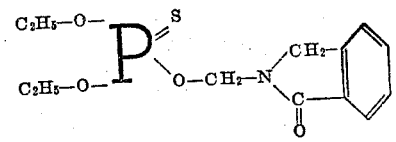

are obtained which can only be distilled with difficulty; it has excellent insecticidal action.

Example 6

932 parts of O.O-diethyl-thionophosphoric acid chloride are allowed to flow slowly at room temperature while stirring into 650 parts of N-methylol-thiopyrrolidone-(2) which are dissolved in a mixture of 392 parts of pyridine and 500 parts of benzene. After further stirring for 5 hours at 50° C., the whole is cooled, 500 parts of benzene are added and the reaction solution is washed with water. After drying, the solvent is removed under reduced pressure. 1,180 parts of the new ester are obtained as a red-brown undistillable oil in crude form. The yield of ester obtained, which has the formula

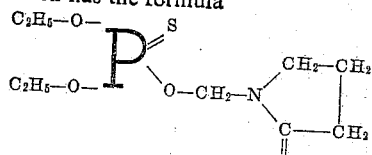

amounts to 84% of the theoretical yield.

Example 7

A solution of 260 parts of N-methylol-piperidone-(2) in 159 parts of pyridine and 1,500 parts of chloroform is reacted at room temperature with 379 parts of O.O-diethyl-thionophosphoric acid chloride while stirring. To complete the reaction, the whole is stirred for a further 5 hours at 50° C. and then worked up as described in Example 1. After removing the solvent under reduced pressure, 302 parts (corresponding to 53.4% of the theoretical yield) of the compound of the formula

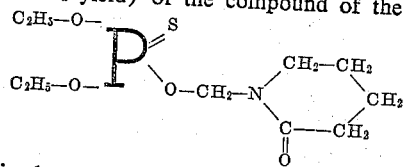

are obtained as a brown non-distillable oil.

Example 8

390 parts of N-(alpha-hydroxy-beta-trichloroethyl)-caprolactam are dissolved in 1,000 parts of pyridine and reacted as described in Example 6 with 282 parts of O.O-diethyl-thionophosphoric acid chloride. For working up, the reaction mixture has 1,500 parts of benzene added thereto and it is then washed with water, dried and the solvent distilled off in vacuo. 421 parts of the ester of the formula

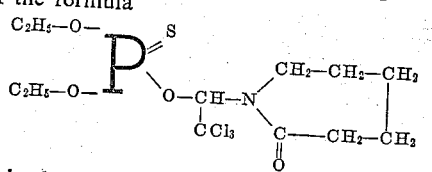

are obtained as a dark brown oil.

Example 9

260 parts of N-methylol-pyrrolidone-(2) are dissolved in a mixture of 1,500 parts of chloroform and 179 parts of pyridine and then 389 parts of O.O-diethyl-phosphoric acid chloride are slowly introduced into the mixture so that the temperature does not rise above 50° C. After the whole has been added, the mixture is stirred for another 4 hours at 70° C., the reaction mixture washed with water, dried and the solvent removed by distillation in vacuo. There is obtained as a residue 320 parts of crude diethyl-phosphoric acid ester of N-methylol-pyrrolidone-(2) as a yellow oil.

Example 10

433 parts of O.O-diethyl-phosphoric acid chloride are slowly introduced at room temperature while stirring into a solution of 330 parts of N-methylol-thiopyrrolidone-(2) in 199 parts of pyridine and 1,000 parts of benzene and the reaction completed by stirring for 5 hours at 50° C. The reaction product is worked up as described in Example 9. 450 parts of the ester of the formula

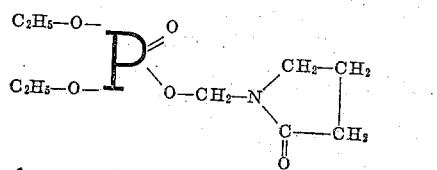

are obtained as an oily crude product.

Example 11

347 parts of O.O-diethyl-phosphoric acid chloride are added in the course of 1 hour to a solution of 260 parts of N-methylol-piperidone-(2) in 1,500 parts of chloroform and 160 parts of pyridine, the reaction temperature not being allowed to exceed 50° C. The mixture is then stirred for 5 hours at about 50° C. and, after working up in the usual way, 203 parts of the O.O-diethyl-phosphoric acid ester of N-methylol-piperidone-(2) obtained as a yellow oil.

Example 12

433 parts of O.O-diethyl-phosphoric acid chloride are slowly introduced at 10° to 15° C. while stirring into a solution of 430 parts of N-methylol caprylic lactam in 1,000 parts of benzene and 199 parts of pyridine. After the reaction has ceased, the reaction product is stirred for 30 hours, washed with water and dried. The solvent is removed under reduced pressure and 382 parts of the new compound of the formula

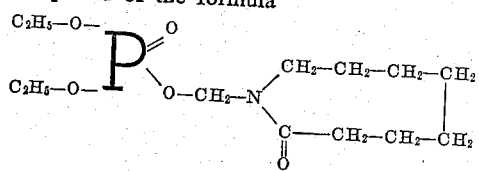

obtained as a residue in the form of a yellow-brown oil.

Example 13

533 parts of diethyl-phosphoric acid chloride are reacted as described in Example 12 with 400 parts of N-(beta-hydroxyethyl)-pyrrolidone-(2) in a mixture of 500 parts of benzene and 245 parts of pyridine. After working up, 600 parts of the compound of the formula

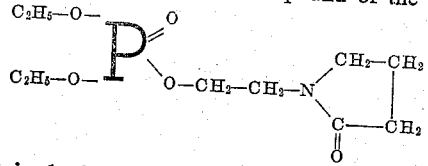

are obtained. The compound is a yellow non-distillable oil.

Example 14

575 parts of N-methylol-pyrrolidone-(2) are dissolved in a mixture of 3,000 parts of chloroform and 395 parts of pyridine. Into the solution there are introduced while stirring, 800 parts of O.O-dimethyl-thionophosphoric acid chloride at such a rate that the temperature does not rise above 50° C. When all has been introduced, the whole is stirred for another 5 hours at 50° C. The reaction mixture is allowed to cool and is washed with water. The washing water is extracted with chloroform and the extracts united with the washed solution. The united organic solutions are dried and the solvent distilled off under reduced pressure. As a residue there are obtained 482 parts (corresponding to 40.3% of the theoretical yield) of the new compound of the formula

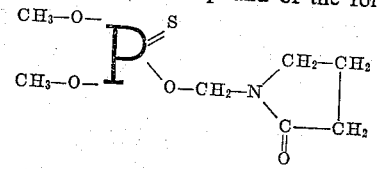

as a pale red non-distillable oil.

Example 15

655 parts of N-methylol-thiopyrrolidone-(2) are reacted, as described in Example 14, with 800 parts of O.O-dimethyl-thionophosphoric acid chloride in the presence of 3,000 parts of chloroform and 395 parts of pyridine. By working up the reaction mixture in the manner described in Example 14, 721 parts of the new thionophosphoric acid ester (56.6% of the theoretical yield) are obtained as an orange-red oily crude product which cannot be distilled.

*Example 16*

800 parts of O.O-dimethyl-thionophosphoric acid chloride are added so slowly to a solution of 715 parts of N-methylol-caprolactam in 3,000 parts of chloroform and 395 parts of pyridine that the reaction temperature does not rise above 50° C. To complete the reaction, the whole is stirred for another 5 hours at 45° to 50° C. After working up the reaction mixture in the usual way, 641 parts of the compound of the formula

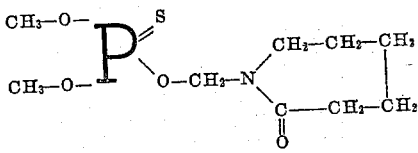

(corresponding to 48% of the theoretical yield) are obtained as a yellow, rather pure, undistillable oil.

*Example 17*

800 parts of O.O-dimethyl-thionophosphoric acid chloride are reacted, as described in Example 14, with a solution of 855 parts of N-methylol caprylic lactam in 3,000 parts of chloroform and 505 parts of triethylamine. After working up, there are obtained 951 parts (corresponding to 64.4% of the theoretical yield) of the new thionophosphoric acid ester of the formula

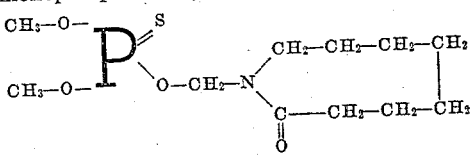

as a pale yellow undistillable oil.

*Example 18*

800 parts of O.O-dimethyl-thionophosphoric acid chloride are added as described in Example 14 to 645 parts of N-(beta-hydroxyethyl)-pyrrolidone-(2) in 3,000 parts of chloroform and 505 parts of triethylamine. After working up the reaction mixture, 803 parts (corresponding to 63.4% of the theoretical yield) of the compound of the formula

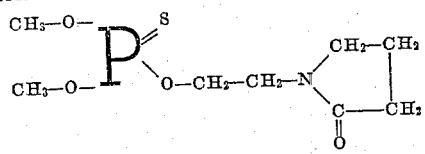

are obtained as a yellow non-distillable oil.

*Example 19*

800 parts of O.O-dimethylthionophosphoric acid chloride are allowed to act, as described in Example 14, on a solution of 645 parts of N-methylol-piperidone-(2) in 3,000 parts of chloroform and 395 parts of pyridine. After working up, there are obtained 541 parts (corresponding to 42.7% of the theoretical yield) of the compound of the formula

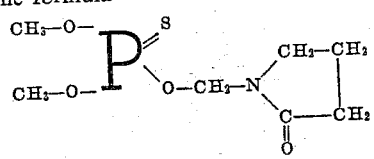

as an orange-red oil.

*Example 20*

575 parts of N-methylol-pyrrolidone-(2) are dissolved in a mixture of 3,000 parts of chloroform and 395 parts of pyridine and then 1,080 parts of O.O-di-normal-propyl-thiono-phosphoric acid chloride is added to the solution at such a rate that the reaction temperature does not rise above 50° C. When all has been added, the whole is stirred further for 5 hours at 50° C. and the mixture then allowed to cool. By the usual working up, 1,130 parts (corresponding to 76.7% of the theoretical yield of the new thionophosphoric acid ester are obtained in the form of a red oil. The thionophosphoric acid ester has the formula

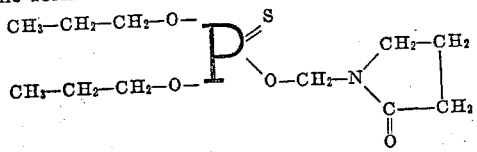

*Example 21*

A solution of 655 parts of N-methylol-thiopyrrolidone-(2) in 3,000 parts of chloroform and 395 parts of pyridine is reacted, as described in Example 14, with 1,080 parts of O.O-di-normal-propyl-thionophosphoric acid chloride. By working up the reaction mixture in the usual manner there are obtained 1,370 parts of the compound of the formula

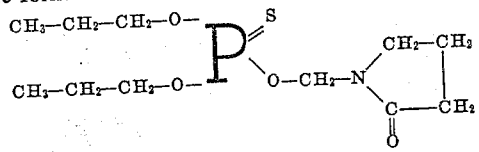

The yield of the new compound amounts to 86.7% of the theoretical yield.

*Example 22*

715 parts of N-methylol-caprolactam are dissolved in 3,000 parts of chloroform and 395 parts of pyridine and then 1,080 parts of O.O-di-normal-propyl-thionophosphoric acid chloride are introduced into the solution while stirring, at such a rate that the temperature of the reaction does not rise above 50° C. After the whole amount of the thionophosphoric acid chloride has been introduced, the whole is stirred for another 3 hours at about 50° C., the mixture allowed to cool and worked up as described in Example 14. After distilling off the solvent there are obtained 1,272 parts (corresponding to 78.7% of the theoretical yield) of the O.O-di-normal-propyl-thionophosphoric acid ester of N-methylol-caprolactam as a pale yellow non-distillable oil.

*Example 23*

855 parts of N-methylol-caprylic lactam, which are dissolved in 3,000 parts of chloroform and 395 parts of pyridine, are reacted as described in Example 22 with 1,080 parts of O.O-di-normal-propyl-thionophosphoric acid chloride. After appropriate working up, 1,371 parts (corresponding to 78.2% of the theoretical yield) of the new compound are obtained as a pale yellow oil.

*Example 24*

A solution of 645 parts of N-methylol-piperidone-(2) in 3,000 parts of chloroform and 395 parts of pyridine is reacted, as described in Example 14, with 1,080 parts of O.O-di-normal-propyl-thionophosphoric acid chloride. After appropriate working up 1,090 parts of the new compound are obtained as an orange-red oil. The yield amounts to 70.6% of the theoretical yield.

*Example 25*

A solution of 575 parts of N-methylol-pyrrolidone-(2) in 3,000 parts of chloroform and 395 parts of pyridine is reacted, as described in Example 14, with 1,080 parts of O.O-di-isopropyl-thionophosphoric acid chloride. After working up, the new thionophosphoric acid ester is obtained in an amount of 1,181 parts as a reddish-yellow oil. The yield of the thionophosphoric acid ester of the formula

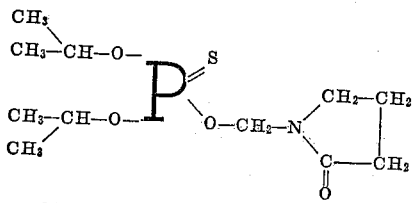

amounts to 80% of the theoretical yield.

*Example 26*

1,080 parts of O.O-di-isopropyl-thionophosphoric acid chloride are introduced while stirring into a solution of 655 parts of N-methylol-thiopyrrolidone-(2) in 3,000 parts of chloroform and 395 parts of pyridine so that the reaction temperature does not exceed 50° C. The reaction mixture is then stirred for another 5 hours at 50° C. and, after cooling, the mixture is worked up in the usual way. 1,480 parts (corresponding to 93.8% of the theoretical yield) of the new thionophosphate are obtained as a reddish-yellow oil.

*Example 27*

1,220 parts of O.O-di-normal-butyl-thionophosphoric acid chloride are allowed to act, as described in Example 14, on a mixture of 575 parts of N-methylol-pyrrolidone-(2), 3,000 parts of chloroform and 715 parts of tripropylamine. After working up, there are obtained 1,270 parts of the compound of the formula

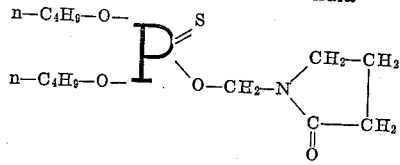

the yield amounts to 78.7% of the theoretical yield.

*Example 28*

1,220 parts of O.O-di-normal-butyl-thionophosphoric acid chloride are allowed to flow so slowly while stirring into a solution of 655 parts of N-methylol-thiopyrrolidone-(2) in 3,000 parts of chloroform and 395 parts of pyridine that the reaction temperature does not exceed 50° C. After the introduction of the thionophosphoric acid chloride is ended, the reaction mixture is stirred for another 16 hours at 35° C. and washed with water. The washing waters are united and extracted with chloroform. The extracts are again added to the reaction mixture which has been washed with water. After drying this mixture, the chloroform is distilled off under reduced pressure. As a distillation residue there are obtained 1,552 parts of O.O-di-normal-butyl-thionophosphoric acid ester of N-methylol-thiopyrrolidone-(2). The compound is a reddish-yellow oil. The yield amounts to 91.4% of the theoretical yield.

*Example 29*

940 parts of O.O-diethyl-thionophosphoric acid chloride are slowly added at 50° C. while stirring well to a mixture of 575 parts of N-methylolpyrrolidone-(2), 690 parts of anhydrous potassium carbonate and 3,000 parts of anhydrous benzene. When the addition is completed, the whole is stirred for another 5 hours at the same temperature. The reaction solution is cooled to room temperature and filtered. The residue is extracted with benzene and the extracts united with the filtrate. The benzene solution is washed with water. After drying, the solvent is distilled off under reduced pressure. The residue consists of 602 parts of the ester obtained in Example 1. The ester is a practically colorless oil. The yield amounts to 45% of the theoretical yield.

*Example 30*

940 parts of O.O-diethyl-thionophosphoric acid chloride are slowly added at 50° C. while stirring well to a mixture of 855 parts of N-methylol-caprylic lactam, 530 parts of anhydrous sodium carbonate and 3,000 parts of anhydrous benzene. When the addition is completed, the whole is stirred for another 5 hours at the same temperature. The reaction mixture cooled to room temperature is filtered. The residue is extracted with benzene and the extracts united with the filtrate. The benzene solution is washed with water. After drying, the solvent is distilled off under reduced pressure. The residue consists of 1,410 parts of the ester obtained in Example 4. The ester is a practically colorless oil. The yield amounts to 87.3% of the theoretical yield.

What we claim is:

1. A compound of the general formula

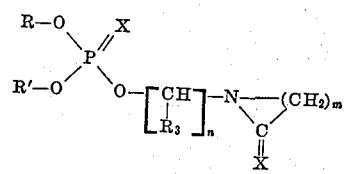

wherein R and R' are lower alkyl groups of 1–4 C-atoms, X is selected from the group consisting of oxygen and sulfur, $R_3$ is selected from the group consisting of hydrogen, an alkyl group of 1–4 C-atoms, and a trichloromethyl group, with the further proviso that said last-mentioned alkyl group and said trichloromethyl group occur as $R_3$ only once, $n$ is an integer of 1 through 4 and $m$ is an integer of 3 through 7.

2. A process for the production of O.O-dialkylphosphoric and -thionophosphoric acid esters of N-alkylol-lactams which comprises intimately admixing an O.O-dialkylphosphoric acid monohalide of the general formula

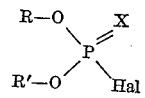

in which R and R' are lower alkyl groups of 1–4 C-atoms, X is selected from the group consisting of oxygen and sulfur, and Hal is a halogen with a N-alkylol-lactam of the general formula

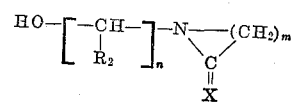

in which $R_3$ is a member selected from the group consisting of hydrogen, an alkyl group of 1–4 C-atoms, and a trichloromethyl group, with the further proviso that said last-mentioned alkyl group and said trichloromethyl group occur as $R_3$ only once, $n$ and $m$ represent integers wherein $n$ is 1 through 4 and $m$ is 3 through 7, and X has the significance given above in an anhydrous organic solvent for said reactants at a temperature of 10 to 100° C. and removing hydrohalogens as formed from the sphere of the reaction by base neutralization of said acids.

3. A method of manufacturing O.O-dialkylphosphoric and -thionophosphoric acid esters by intermixing of an O.O-dialkylphosphoric acid monohalide of the general formula

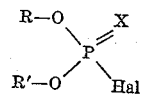

in which R and R' are alkyl groups of 1–4 C-atoms, X is selected from the group consisting of oxygen and sulfur and Hal is a halogen atom in an anhydrous organic solvent media at a temperature of 10° to 100° C. with a N-alkylol-lactam of the general formula

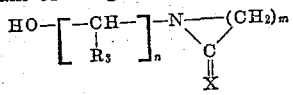

wherein $R_3$ is selected from the group consisting of hydrogen, an alkyl group of 1–4 C-atoms, and a trichloromethyl group, with the further proviso that said last-mentioned alkyl group and said trichloromethyl group occur as $R_3$ only once, $n$ and $m$ are integers wherein $n$ is 1 through 4 and $m$ is 3 through 7 and X is as stated above, and during the ensuing reaction removing hydrogen halides as formed from the sphere of the reaction by base neutralization of said acids.

4. The process as claimed in claim 2, wherein the reactants are used in substantially stoichiometrically equivalent amounts.

5. The compound of the formula.

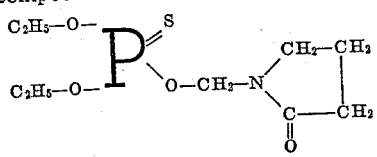

6. The compound of the formula

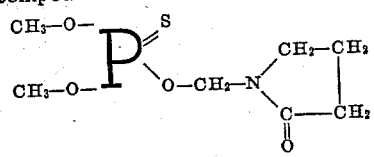

7. The compound of the formula

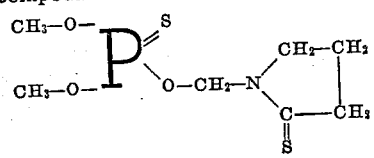

8. The compound of the formula

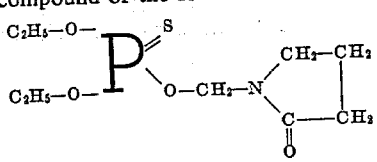

9. The compound of the formula

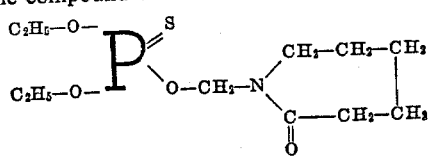

10. The compound of the formula

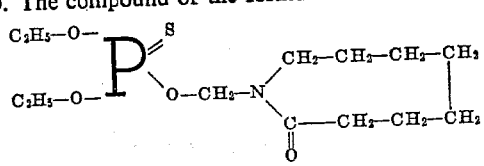

11. The compound of the formula

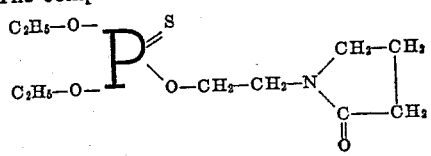

12. The compound of the formula

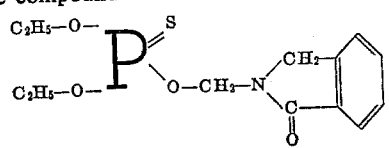

No references cited.

UNITED STATES PATENT OFFICE
Certificate of Correction

Patent No. 2,865,912                                                           December 23, 1958

Heinz Pohlemann et al.

It is hereby certified that error appears in the printed specification of the above numbered patent requiring correction and that the said Letters Patent should read as corrected below.

Column 5, lines 70 to 74, Example 10, column 8, lines 26 to 31, Example 21, and column 12, lines 4 to 7, claim 8, the right-hand portion of the formula in each occurrence should read as shown below instead of as in the patent:

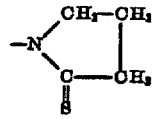

column 10, lines 50 to 52, second formula in claim 2, the left-hand portion of the formula should read as follows instead of as in the patent:

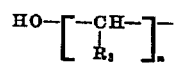

Signed and sealed this 12th day of May 1959.

[SEAL]

Attest:
KARL H. AXLINE,
*Attesting Officer.*

ROBERT C. WATSON,
                                                        *Commissioner of Patents.*